May 10, 1960
T. STEWART
2,935,873
DIVER HELD DEPTH GAUGE
Filed April 30, 1956
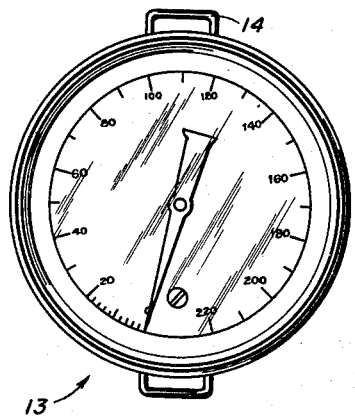
*Fig. 1*
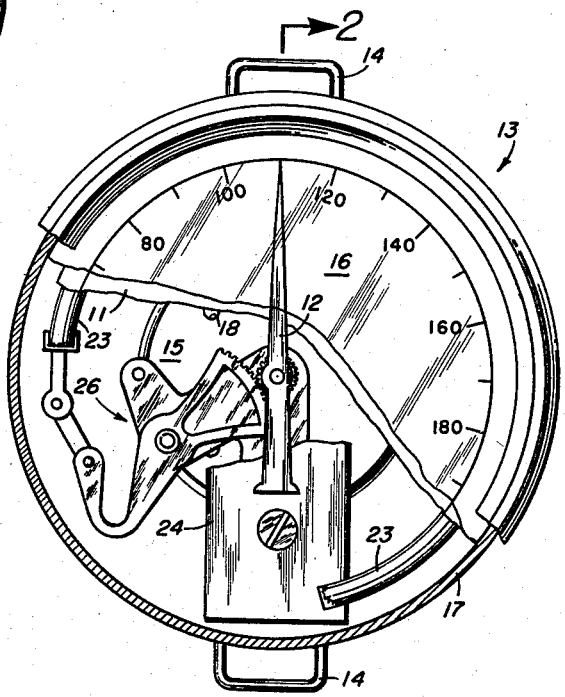
*Fig. 3*
*Fig. 2*
INVENTOR.
TRIGG STEWART
BY
*George E. Pearson*
ATTORNEYS

United States Patent Office 2,935,873
Patented May 10, 1960

2,935,873
DIVER HELD DEPTH GAUGE
Trigg Stewart, Lakeside, Calif.

Application April 30, 1956, Serial No. 581,814

1 Claim. (Cl. 73—300)

(Granted under Title 35, U.S. Code (1952), sec. 266)

The invention described herein may be manufactured and used by or for the Government of the United States of America for governmental purposes without the payment of any royalties thereon or therefor.

This inveniton relates to underwater depth gauges and in particular to a gauge which may be carried by a diver in his underwater operations and which is highly accurate and insensitive to changes in temperature. The gauge may be used in measuring vertical height of underwater objects or for topographical mapping based on differential depth measurements and may be used both as a safety device for the underwater swimmer and as a scientific instrument.

Heretofore a narrow tube closed at one end was filled with air and inserted into the water with the open end downward. Water pressure on the open end of the tube forced water into the tube, compressing the air therein. The tube was calibrated to read the water penetration in terms of feet below the surface of the water. However, this old type of depth gauge became inaccurate through the activity of the diver as water displaced the air in the tube, instead of compressing it. Further, this manometer type gauge gave readings on a logarithmic scale and therefore could not be read with sufficient accuracy to be acceptable at relatively shalow depth. Increase in the tube length by folding the tube resulted in poor reliability because of trapped bubbles and articulate matter. This type gauge was also highly sensitive to temperature which resulted in inaccurate readings resulting from the expansion or contraction of the air entrapped in the gauge and the accompanying pressure changes resulting therefrom.

The depth gauge depicted by this invention uses an evacuated, sealed, elastic Bourdon tube encased in a housing filled with castor oil or other pressure translating fluid. At least a portion of the housing has a flexible membrane through which pressure of sea water may be transmitted to the castor oil within the housing. Connected to the Bourdon tube in a conventional manner is suitable linkage mechanism for rotating an indicating pointer around a dial to indicate the depth of sea water in feet on a linear scale. The gauge is small, compact and may be easily read by the diver who straps it on his wrist in the manner of a wrist watch.

It is therefore an object of this invention to provide for an underwater depth gauge utilizing the Bourdon tube principle, yet which is relatively insensitive to changes in temperature as a result of the evacuation of the tube.

Another object of this invention is the provision of a depth gauge whose calibrations are linear and which can be easily read by the diver underwater.

Another object is the provision of a depth gauge utilizing the Bourdon tube principle in which the tube is evacuated and the variable pressure to be measured is applied externally of said tube.

Another object is the provision of an underwater depth gauge encased in a water tight housing and having an oil water interface chamber provided to protect the Bourdon tube and its indicating mechanism from the corrosive action of sea water and other contaminants.

Other objects and many of the attendant advantages of this invention will be readily appreciated as the same becomes better understood by reference to the following detailed description when considered in connection with the accompanying drawings wherein:

Fig. 1 is a plan view of the depth gauge;

Fig. 2 is a cross-sectional view taken along the lines of 2—2 of Fig. 3; and

Fig. 3 is a plan view with the parts removed to show the linkage between the tube and the indicator.

Referring now to the drawings wherein like numerals designate like parts throughout the several views, there is shown in Fig. 1 depth indicating dial 11 and depth indicating pointer 12. The dial is calibrated linearly from 0 to 220 feet. The diameter of the housing 13 is such that it may be worn on the diver's wrist with straps fastened to the strapping members 14. As seen in the cross-sectional view of Fig. 2, the housing consists of a transparent facing 16 sealed to the sides 17 of the housing. In the back 15 of the housing are apertures 18 covered by a diaphragm 19 spaced therefrom and a diaphragm guard 21 with perforations 22 therein to permit pressure from the sea water to be exerted on the outer surface of the diaphragm. The back 15 prevents damage to the internal structure of the gauge due to excessive diaphragm movement whereas guard 21 prevents damage to the diaphragm from external sources. The housing is filled with castor oil, glycerine or other non-compressible fluid 20 to lubricate all components therewithin and to transmit the pressure from the sea water on the diaphragm to the pressure sensitive Bourdon tube 23. The damping effect of the viscous fluid minimizes the chance of damage to the sensitive elements of the gauge due to shock and vibration. One end of the tube of any suitable material having a zero thermo-elastic constant, such as, for example, Ni-Span-C made by Wilson Company, Newark, N.J., is attached to a base member 24 secured to the inner surface of the back 15 of the housing. The other end of the tube is connected to suitable linkage structure 26 for rotating the dial pointer 12 as shown in Fig. 3. The tube is curved, elongated in cross-section and evacuated. The air having been evacuated from the tube there is no change in reference pressure due to temperature change in the air as normally occurs with the ordinary Bourdon tube. The fluid 20 serves to transmit pressure from the sea water to the outside of the Bourdon tube, causing the tube to flatten somewhat thereby increasing its spiral configuration with increased pressure. Thus it can be said that change in external pressure inversely changes the cross-sectional area of the tube. As shown in Fig. 3, the tube is curved counter-clockwise from its fixed end secured to base member 24. In this manner, as the additional pressure is exerted within the tube housing, the pressure of the surrounding medium tends to collapse the walls of the tube, causing a greater spiral curvature which, through the linkage, causes the pointer to rotate clockwise to show a greater reading on the dial.

While this is the preferred embodiment of the present invention, other types of structure will readily become obvious. For example, any kind of transparent bag or sack or flexible material for containing castor oil, glycerine, alcohol, or similar non-compressible liquids, may be used as a gauge. It should preferably be transparent over the face of the dial and the liquid also should be transparent since the instrument dial and pointer are immersed in the liquid and must be visible therethrough. Also with some modification in the mechanical linkage the same principles may be applied using a sealed, evacuated spring bellows or similar pressure sensitive device. It will be understood that various other changes might be made in the construction, and arrangement of parts, by those skilled in the art, without departing from the spirit of the invention as claimed.

What is claimed is:

In an underwater depth gauge of the type described, a fluid tight housing, a transparent face, a back provided with a plurality of apertures therein, a perforated guard plate mounted externally of said housing back, a diaphragm mounted between the back and guard plate in spaced relation thereto and provided with a resilient portion covering said apertures and in external communication with the perforations in said guard plate, said diaphragm forming a fluid tight seal separating said apertures and perforations, a non-compressible pressure transmitting transparent lubricating fluid having non-corrosive protective properties and contained in said housing, a sealed curved tube having one end mounted on said housing and a free end, said tube being elongated in cross-section and operable to increase its curvature with increased pressure transmitted to its exterior by said fluid thereby moving said free end of said tube, said tube being evacuated and constructed of materials providing a zero thermo-elastic constant whereby the free end of the tube responds linearly to pressure changes regardless of temperature variations, indicating means connected to said free end for indicating the position of said free end responsive to said pressures, indicia means for linearly translating the position of said free end into quantities of pressure, said indicia means and said indicating means being submerged in said transparent fluid and positioned for viewing through said transparent face.

References Cited in the file of this patent

UNITED STATES PATENTS

| 9,163 | Bourdon | Aug. 3, 1852 |
| 874,517 | Lowry | Dec. 24, 1907 |
| 2,216,374 | Martin | Oct. 1, 1940 |
| 2,307,838 | Jacobsson | Jan. 12, 1943 |
| 2,530,068 | McCabe | Nov. 14, 1950 |
| 2,592,159 | Klebba et al. | Apr. 8, 1952 |

FOREIGN PATENTS

| 20,641 | Great Britain | Nov. 15, 1900 |
| 1,011,265 | France | June 20, 1952 |